Patented Nov. 17, 1936

2,061,114

UNITED STATES PATENT OFFICE 2,061,114

N-MONOALKYLATED 5.5-DISUBSTITUTED BARBITURIC ACIDS

Ludwig Taub and Walter Kropp, Wuppertal-Elberfeld, Germany, assignors to Winthrop Chemical Company Inc., New York, N. Y., a corporation of New York No Drawing. Application December 3, 1932, Serial No. 645,636. In Germany December 31, 1931

20 Claims. (Cl. 260—33)

This invention relates to the manufacture of N-monoalkylated 5.5-disubstituted barbituric acids and to barbituric acid derivatives which are intermediate products in the process of the said manufacture.

In our copending applications Serial No. 462,413, filed June 9, 1930 (now Patent No. 1,923,239, dated August 22, 1933), and Serial No. 610,982, filed March 12, 1932, we have described processes for the manufacture of N-alkylated 5.5-disubstituted barbituric acids. An embodiment of the processes described therein is the condensation of disubstituted malonic or cyano acetic acids or their derivatives, such as their esters, amides, amide-acid esters, chlorides or nitriles with suitable urea or its derivatives, such as alkylated guanidines, thioureas and isourea ethers to the corresponding condensation products and then decomposing the said condensation products by a saponification process to the N-alkylated 5.5-disubstituted barbituric acids. As desired, N-mono- and N-dialkylated 5.5-disubstituted barbituric acids are obtainable by such processes, however, when preparing the monoalkylated compounds besides the monoalkylated product normally a certain quantity of the dialkylated product is formed in the reaction.

Our present invention provides for a process in which only monoalkylated 5.5-disubstituted barbituric acids can be formed, which are, therefore, directly obtained in a uniform state and high degree of purity, so that the yield of the N-monoalkylated compounds is not diminished by the formation of the N-dialkylated compound. This process is, therefore, especially advantageous for the manufacture of N-monoalkylated 5.5-disubstituted barbituric acids.

In accordance with the present invention, the N-monoalkylated 5.5-disubstituted barbituric acids are obtainable by reacting in the customary manner an alkylating agent upon the condensation product of dicyanodiamide and a disubstituted malonic or cyanoacetic acid or a derivative thereof, such as their esters, amides, amide-acid esters, chlorides or nitriles, and saponifying the alkylation product formed to obtain the N-monoalkylated 5.5-disubstituted barbituric acid. Our new process may be further explained, for instance, when starting with a disubstituted malonic acid ester, by the following reaction scheme (R stands for alkyl, $R_1$ and $R_2$ stand for alkyl, alkenyl, aryl, arylalkyl, cycloalkyl and cycloalkenyl):

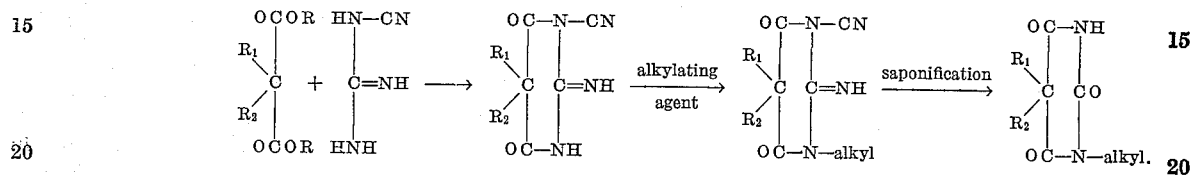

It is assumed that the formulae indicated above and hereinafter described correspond to the real constitution; we wish to point out, however, that slight deviations embodied in the constitution are also possible.

When starting with a disubstituted cyanoacetic acid ester, the reaction takes place in accordance with the following scheme:

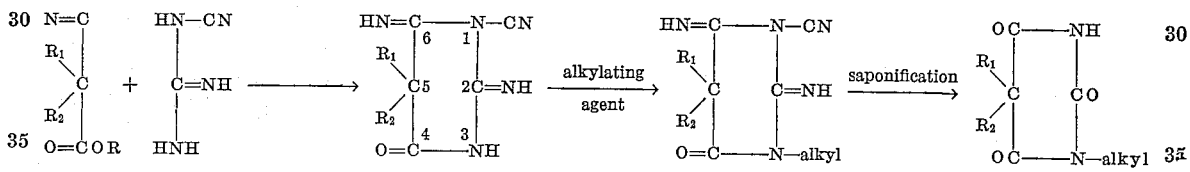

Advantageously salts, preferably alkali or alkaline-earth metal salts or salts of tertiary bases of the disubstituted cyano-imino barbituric acids are used in the alkylation process. The alkylation is performed in the usual manner at a temperature customary for the specific alkylation agent used and, if necessary, in the presence of a solvent which is inert to the reacting components, such as water, alcohols, benzene, etc. As alkylating agents usual in alkylation processes may be used, for instance, alkyl halides, such as methyl-, ethyl-, propyl- and isopropyl iodide, alkyl sulfates, such as dimethyl- and diethylsulfate or arylsulfonic acid alkyl esters, such as toluene sulfonic acid methyl, ethyl and propyl esters or diazomethane.

The alkylation products formed which are 1-cyano-2-imino-3-alkyl-5.5-disubstituted barbituric acids or the corresponding 6-imino compounds are white crystalline substances which scarcely dissolve in hot water, but are more soluble in alcohols. In order to transform the said intermediate products into the N-monoalkylated 5.5-disubstituted barbituric acid derivatives, they are freed from the cyano and imino groups by saponification by means of a dilute mineral acid. Preferably we heat the alkylation product with an excess of an about 20% sulfuric acid under reflux during several hours, but also other mineral acids, for instance, hydrochloric or phosphoric acid may be used in the saponification process. The N-monoalkylated 5.5-disubstituted barbituric acid derivatives separate from the acid saponification mixture and may be purified by recrystallizing, for instance, with alcohols.

It may be mentioned that it is not necessary to isolate the intermediate products of each stage of our process of manufacturing N-monoalkylated 5.5-disubstituted barbituric acids, rather, it is possible to carry out the condensation, alkylation and saponification in a single operation, whereby the process may be remarkably simplified.

The N-monoalkylated 5.5-disubstituted barbituric acids form whitish crystals which are insoluble in water but soluble in organic solvents, such as alcohol, acetic ester, acetone. They form alkali and alkaline earth metal salts and salts with organic bases which may be used in therapy as well as the free acids as such. Those barbituric acid derivatives wherein the alkyl group substituting the nitrogen atom is a methyl or ethyl group and wherein the substituents in the 5-position are saturated or unsaturated alkyl, phenyl or cycloalkenyl, such as cyclopentenyl and cyclohexenyl groups, have proved particularly valuable for the therapeutic use.

The invention is further illustrated by the following examples, but is not limited to the details disclosed therein. The parts are by weight.

*Example 1.*—92 parts of dicyanodiamide and 264 parts of phenyl-ethyl-malonic acid diethylester are added to a solution of 46 parts of sodium metal in 300 parts of methanol and the mixture is heated under reflux at 70 to 80° C. for about 10 hours. The methanol is then distilled off. The residue is dissolved in 2000 parts of water. The solution obtained is cooled with ice and then acidified by means of dilute sulfuric acid until the reaction is weakly acid to Congo-red. The crystalline precipitate formed is thoroughly sucked off, washed with water and dried in a steam bath. The 1-cyano-2-imino-5-phenyl-5-ethyl barbituric acid forms after recrystallizing from dilute alcohol colorless needles melting at 223° C.

256 parts of this compound are dissolved in 3000 parts of a normal aqueous sodium hydroxide solution. 150 parts of dimethylsulfate are added to the solution at a temperature not exceeding 40° C., while vigorously stirring. After all the dimethyl sulfate has reacted, the ice-cold alkaline solution is acidified by means of dilute sulfuric acid and the acid mother liquor is siphoned off from the precipitate which is at first sticky but becomes crystalline after prolonged rubbing.

The 1-cyano-2-imino-3-methyl-5-phenyl-5-ethyl barbituric acid of the probable formula:

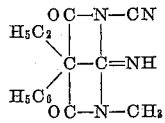

melting, after recrystallizing from methanol, at 150 to 151° C., is boiled under reflux with 5 to 6 times its quantity of a 20% sulfuric acid during 6 hours. After cooling off, the 3-methyl-5-phenyl-5-ethyl barbituric acid, which has separated in the form of a heavy crystal flour, is sucked off, washed with water and recrystallized from 13 times its quantity of alcohol. It is thus obtained in the form of a micro-crystalline whitish powder melting at 176° C.

*Example 2.*—140 parts of dimethyl sulfate are added, while stirring, to the solution of 1-cyano-2-imino-5-phenyl-5-ethyl barbituric acid in methanol, as obtained after heating dicyanodiamide and phenyl-ethyl malonic acid diethylester in sodium methylate solution, in accordance with the directions in Paragraph 1 of Example 1, care being taken that the temperature does not rise above 50° C. After the reaction temperature has decreased, the methyl alcohol is distilled off on the water bath, and the residue containing 1-cyano-2-imino-3-methyl-5-phenyl-5-ethyl barbituric acid, is boiled under reflux with 6 times its quantity of a 20% aqueous sulfuric acid during 6 hours, while stirring. The reaction product is isolated as described in Example 1.

In an analogous manner, 3.5-dimethyl-5-phenyl barbituric acid, melting at 154° C., is obtained when starting with phenyl-methyl malonic acid diethylester.

*Example 3.*—245 parts of 5-(Δ-1.2-cyclohexenyl)-5-methyl-2.6-di-imino-1-cyano barbituric acid (decomposing when heated at 265° C.) are added to a warm solution of 46 parts of sodium metal in 1000 parts of dried methyl alcohol. The clear solution is cooled to 15° C. and mixed with 250 parts of dimethyl sulfate, care being taken that the temperature does not rise above 55° C. After standing for several hours, the main portion of the methanol is distilled off, and the residue, containing 1-cyano-2.6-di-imino-3.5-dimethyl-5-(Δ 1.2-cyclohexenyl)-barbituric acid is boiled under reflux in 1000 parts of a 25% sulfuric acid during 8 hours. The 5-(Δ-1.2-cyclohexenyl)-3.5-dimethyl barbituric acid separated is sucked off, washed with water and after drying recrystallized from acetic acid ethyl ester. It melts at 146° C.

The 1-cyano-2.6-di-imino-3.5-dimethyl-5-(Δ-1.2-cyclohexenyl)-barbituric acid may be obtained from the residue above mentioned in a pure and crystallized form by treating the said residue with weakly acidified water. The precipitate formed is sucked off and the remaining powder is recrystallized from boiling methyl alcohol. Colorless needles which melt at 255° C. and are difficultly soluble in hot water, are thus obtained.

*Example 4.*—200 parts of para-toluene sulfonic acid ethyl-ester are added to the methyl alcoholic solution of 1-cyano-2-imino-5-phenyl-5-ethyl barbituric acid as obtained after heating dicyanodiamide and phenyl-ethyl malonic acid diethylester in sodium methylate solution in accordance with the directions in Paragraph 1 of Example 1. The solution is heated under reflux for about 2 hours, thereafter the methanol is distilled off on the water bath and the residue containing the 1-cyano-2-imino-3-ethyl-5-phenyl-5-ethyl barbituric acid is boiled with 6 times its quantity of a 20% sulfuric acid. The 3.5-diethyl-5-phenyl barbituric acid separated is sucked off and washed with water. After recrystallizing with alcohol, it melts at 102° C.

The 3-ethyl-5-phenyl-5-methyl barbituric acid, prepared in an analogous manner, is a white crystalline powder, melting at 132° C.

*Example 5.*—92 parts of dicyanodiamide and 217 parts of phenyl-ethyl-cyano acetic acid ethylester (boiling under 18 mm. pressure at 155° C.) are added to a solution of 46 parts of sodium metal in 300 parts of methanol. The mixture is heated under reflux at 70 to 80° C. during about 10 hours. After cooling, 250 parts of dimethyl sulfate are added, care being taken that the temperature does not rise above 50° C. After standing for several hours, the methanol is distilled off on the water bath and the residue containing the 1-cyano-2.6-di-imino-3-methyl-5-phenyl-5-ethyl barbituric acid boiled with 6 times its quantity of a 25% sulfuric acid. The 5-phenyl-5-ethyl-3-methyl barbituric acid formed is isolated in accordance with the directions described in Example 1.

The 1-cyano-2.6-di-imino-3-methyl-5-phenyl-5-ethyl-barbituric acid may be obtained from the residue above mentioned in a pure crystalline form by treating the said residue with water and a small quantity of dilute sulfuric acid. The precipitate thereby formed is sucked off, washed neutral and recrystallized from hot alcohol. The 1-cyano-2.6-di-imino-3-methyl-5-phenyl-5-ethyl barbituric acid is thus obtained in fine needles which are difficultly soluble in hot water, but more soluble in alcohol, and melt at 275° C.

*Example 6.*—92 parts of dicyanodiamide and 240 parts of diallyl malonic acid diethylester are added to a solution of 46 parts of sodium metal in 300 parts of methanol. The mixture is heated under reflux at 70 to 80° C. during 10 hours and, after cooling, mixed with 150 parts of dimethyl sulfate. The 1-cyano-2-imino-3-methyl-5.5-diallyl barbituric acid formed is saponified as described above. The 5-diallyl-3-methyl barbituric acid thereby obtained is isolated in accordance with the directions given in Example 2. It forms colorless needles melting at 80° C.

Instead of dialkyl sulfates and toluene sulfonic acid alkyl esters, other usual alkylating agents, such as alkyl halides, for instance, methyl bromide, ethyl and isopropyl iodide may be used in the processes described, if desired with the addition of catalysts, for instance, copper or pyridine.

We claim:—

1. Barbituric acid derivatives of the formula:

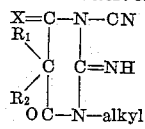

wherein $R_1$ and $R_2$ stand for a substituent selected from the group consisting of alkyl and alkenyl of mono-nuclear aryl and cycloalkenyl and X stands for a member of the group consisting of O and =NH, and which barbituric acid derivatives are whitish crystalline substances insoluble in water but more soluble in alcohols.

2. Barbituric acid derivatives of the formula:

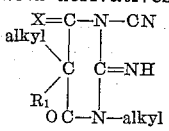

wherein $R_1$ stands for a substituent selected from the group consisting of alkyl and alkenyl, of mono-nuclear aryl and cycloalkenyl, and X stands for a member of the group consisting of O and =NH, and which barbituric acid derivatives are whitish crystalline substances insoluble in water but more soluble in alcohols.

3. Barbituric acid derivatives of the formula:

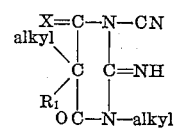

wherein $R_1$ stands for a substituent selected from the group consisting of alkyl and alkenyl, of mono-nuclear aryl and cycloalkenyl, X stands for a member of the group consisting of O and =NH and each alkyl group contains at the most two carbon atoms, which barbituric acid derivatives are whitish crystalline substances insoluble in water, but more soluble in alcohols.

4. Barbituric acid derivatives of the formula:

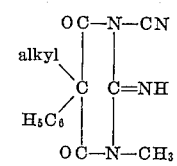

which barbituric acid derivatives are whitish crystalline substances insoluble in water but more soluble in alcohols.

5. The product of the formula:

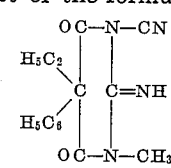

which product, forming white crystals melting at 150 to 151° C., is insoluble in water but more soluble in alcohols.

6. Barbituric acid derivatives of the formula:

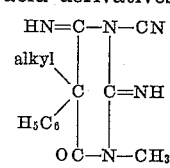

which barbituric acid derivatives are whitish crystalline substances insoluble in water but more soluble in alcohols.

7. The product of the formula:

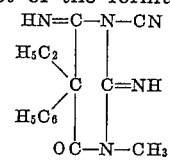

which product, forming white crystals melting at 275° C., is insoluble in water but more soluble in alcohols.

8. In the process of preparing barbituric acid derivatives, the step which comprises reacting upon a barbituric acid derivative of the formula:

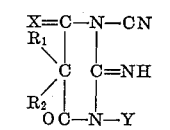

wherein $R_1$ and $R_2$ stand for a substituent selected from the group consisting of alkyl and alkenyl, mono-nuclear aryl and cycloalkenyl, X stands for a member of the group consisting of O and =NH, and Y stands for a member of the group consisting of alkali metals, alkaline earth metals, and tertiary bases with an alkylating agent in the presence of a diluent which is inert to the reacting components.

9. In the process of preparing barbituric acid derivatives, the step which comprises reacting upon a barbituric acid derivative of the formula:

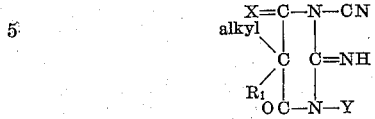

wherein $R_1$ stands for a substituent selected from the group consisting of alkyl and alkenyl, of mono-nuclear aryl and cycloalkenyl, X stands for a member of the group consisting of O and =NH, and Y stands for a member of the group consisting of alkali metals, alkaline-earth metals, and tertiary bases with an alkylating agent in the presence of a diluent which is inert to the reacting components.

10. In the process of preparing barbituric acid derivatives, the step which comprises reacting upon a barbituric acid derivative of the formula:

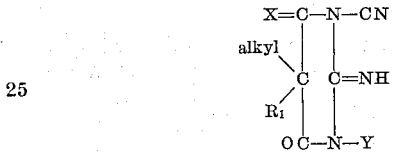

wherein $R_1$ stands for a substituent selected from the group consisting of alkyl and alkenyl, of mono-nuclear aryl and cycloalkenyl, X stands for a member of the group consisting of O and =NH, and Y stands for a member of the group consisting of alkali metals, alkaline-earth metals, and tertiary bases with a methylating agent in the presence of a diluent which is inert to the reacting components.

11. In the process of preparing barbituric acid derivatives, the step which comprises reacting upon a barbituric acid derivative of the formula:

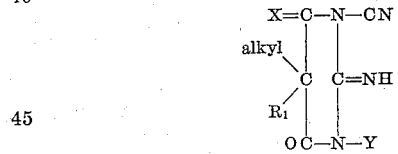

wherein $R_1$ stands for a substituent selected from the group consisting of alkyl and alkenyl, of mono-nuclear aryl and cycloalkenyl, X stands for a member of the group consisting of O and =NH and Y stands for a member of the group consisting of alkali metals, alkaline-earth metals and tertiary bases with dimethyl sulphate in an aqueous caustic alkali solution.

12. The process which comprises reacting upon a barbituric acid derivative of the formula:

wherein $R_1$ and $R_2$ stand for a substituent selected from the group consisting of alkyl and alkenyl, of mono-nuclear aryl and cycloalkenyl, X stands for a member of the group consisting of O and =NH, and Y stands for a member of the group consisting of alkali metals, alkaline-earth metals, and tertiary bases with an alkylating agent in the presence of a diluent which is inert to the reacting components, saponifying the alkylation product formed by heating with a saponifying agent and isolating the 5.5-di-substituted N-mono-alkylated barbituric acid formed from the acid reaction solution.

13. The process which comprises reacting upon a barbituric acid derivative of the formula:

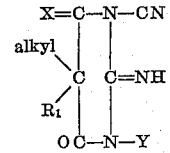

wherein $R_1$ stands for a substituent selected from the group consisting of alkyl and alkenyl, of mono-nuclear aryl and cycloalkenyl, X stands for a member of the group consisting of O and =NH, and Y stands for a member of the group consisting of alkali metals, alkaline-earth metals and tertiary bases, with an alkylating agent in the presence of a diluent which is inert to the reacting components, saponifying the alkylation product formed by heating with a saponifying agent and isolating the 5.5-di-substituted N-mono-alkylated barbituric acid formed from the acid reaction solution.

14. The process which comprises reacting upon a barbituric acid derivative of the formula:

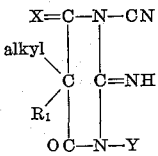

wherein $R_1$ stands for a substituent selected from the group consisting of alkyl and alkenyl, of mono-nuclear aryl and cycloalkenyl, X stands for a member of the group consisting of O and =NH, and Y stands for a member of the group consisting of alkali metals, alkaline-earth metals, and tertiary bases, with an alkylating agent in the presence of a diluent which is inert to the reacting components, saponifying the alkylation product formed by heating with dilute sulphuric acid and isolating the 5.5-di-substituted N-mono-alkylated barbituric acid formed from the acid reaction solution.

15. The process which comprises reacting upon a barbituric acid derivative of the formula:

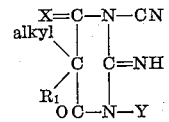

wherein $R_1$ stands for a substituent selected from the group consisting of alkyl and alkenyl, of mono-nuclear aryl and cycloalkenyl, X stands for a member of the group consisting of O and =NH, and Y stands for a member of the group consisting of alkali metals, alkaline-earth metals, and tertiary bases, with a di-alkyl sulphate in an aqueous caustic alkali solution, saponifying the alkylation product formed by heating with dilute sulphuric acid and isolating the 5.5-di-substituted mono-alkylated barbituric acid formed from the acid reaction solution.

16. The process which comprises reacting upon a barbituric acid derivative of the formula:

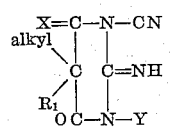

wherein $R_1$ stands for a substituent selected from the group consisting of alkyl and alkenyl, of mono-nuclear aryl and cycloalkenyl, X stands for a member of the group consisting of O and =NH, and Y stands for a member of the group consisting of alkali metals, alkaline earth metals, and tertiary bases with dimethyl sulphate in an aqueous caustic alkali solution, saponifying the methylation product formed by heating with dilute sulphuric acid and isolating the 5.5-di-substituted N-mono-alkylated barbituric acid formed from the acid reaction solution.

17. The process which comprises reacting upon a barbituric acid derivative of the formula:

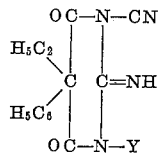

wherein Y stands for a member of the group consisting of alkali-metals, alkaline-earth metals and tertiary bases, with dimethyl sulphate in an aqueous caustic alkali solution, saponifying the 1-cyano-2-imino-3-methyl-5-ethyl-5-phenyl barbituric acid formed by heating with dilute sulphuric acid and isolating the 3-methyl-5-ethyl-5-phenyl barbituric acid obtained from the acid reaction solution.

18. The process which comprises reacting upon a barbituric acid derivative of the formula:

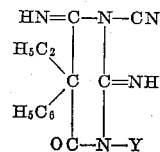

wherein Y stands for a member of the group consisting of alkali-metals, alkaline-earth metals and tertiary bases, with dimethyl sulphate in an aqueous caustic alkali solution, saponifying the 1-cyano-2.6-di-imino-3-methyl-5-ethyl-5-phenyl barbituric acid formed by heating with dilute sulphuric acid and isolating the 3-methyl-5-ethyl-5-phenyl barbituric acid obtained from the acid reaction solution.

19. The product of the formula:

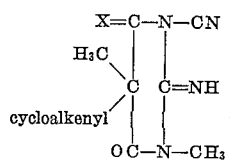

wherein X stands for one of the groups =O and =NH, which products form whitish crystals insoluble in water, but more soluble in alcohols.

20. The product of the formula:

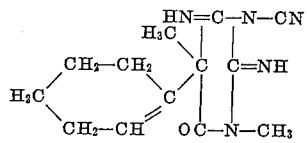

forming whitish crystals melting at 255° C. which are difficultly soluble in water.

LUDWIG TAUB.
WALTER KROPP.